(12) United States Patent
Ali Shah et al.

(10) Patent No.: US 9,112,742 B2
(45) Date of Patent: Aug. 18, 2015

(54) LOW-COMPLEXITY, ADAPTIVE, FRACTIONALLY SPACED EQUALIZER WITH NON-INTEGER SAMPLING

(71) Applicant: Futurewei Technologies, Inc., Plano, TX (US)

(72) Inventors: Syed Faisal Ali Shah, Kanata (CA); Chuandong Li, Ottawa (CA); Zhuhong Zhang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/277,298

(22) Filed: May 14, 2014

(65) Prior Publication Data
US 2014/0341267 A1 Nov. 20, 2014

Related U.S. Application Data

(60) Provisional application No. 61/823,649, filed on May 15, 2013.

(51) Int. Cl.
*H04L 25/03* (2006.01)

(52) U.S. Cl.
CPC .... *H04L 25/03885* (2013.01); *H04L 25/03044* (2013.01)

(58) Field of Classification Search
CPC ............... H04L 2025/03509; H04L 25/03044; H04L 7/0079; H04L 25/03885
USPC .................................. 375/234, 229, 230, 232
See application file for complete search history.

(56) References Cited

U.S. PATENT DOCUMENTS

| | | | |
|---|---|---|---|
| 5,095,495 A * | 3/1992 | Golden | 375/234 |
| 5,495,203 A | 2/1996 | Harp et al. | |
| 7,248,630 B2 | 7/2007 | Modrie et al. | |
| 2010/0220780 A1 * | 9/2010 | Peng et al. | 375/232 |

OTHER PUBLICATIONS

Laakso, et al., "Splitting—Tools for Fractional Delay Filter Design," IEEE Signal Processing Magazine, Jan. 1996, pp. 30-60.
Oetken, "A New Approach for the Design of Digital Interpolating Filters," IEEE Transactions on Acoustics, Speech, and Signal Processing, vol. ASSP-27, No. 6, Dec. 1979, pp. 637-643.
McClellan, et al., "A Personal History of the Parks-McClellan Algorithm," IEEE Signal Processing Magazine, Mar. 2005, pp. 82-86.
(Continued)

*Primary Examiner* — Vineeta Panwalkar
(74) *Attorney, Agent, or Firm* — Conley Rose, P.C.; Grant Rodolph; William H. Dietrich

(57) ABSTRACT

An apparatus comprising a memory and a processor coupled to the memory, wherein the memory includes instructions that when executed by the processor cause the apparatus to perform the following receive an incoming signal at a sampling rate that is greater than a symbol rate associated with the incoming signal, replicate a plurality of data streams from the incoming signal, apply a plurality of fractional delays for the data streams, and perform an adaptive equalization on a plurality of data blocks generated from the data streams, wherein the fractional delay is applied to the data streams independently of the adaptive equalization, and wherein the adaptive equalization implements taps spaced at a fraction of a symbol interval associated with the incoming signal.

20 Claims, 8 Drawing Sheets

(56) References Cited

OTHER PUBLICATIONS

Ip, et al., "Digital Equalization of Chromatic Dispersion and Polarization Mode Dispersion," Journal of Lightwave Technology, vol. 255, No. 8, Aug. 2007, pp. 2033-2043.

Malouin, et al., "Sub-Rate Sampling in 100 Gb/s Coherent Optical Receivers," OThT3.pdf, OSA/OFC/NFOEC 2010, 3 pages.

Shah, et al., "Low-Complexity Non-Integer Sub-Symbol Sampling DSP for Coherent Receivers," Submitted to European Conference on Optical Communications Apr. 15, 2014, 2 pages.

\* cited by examiner

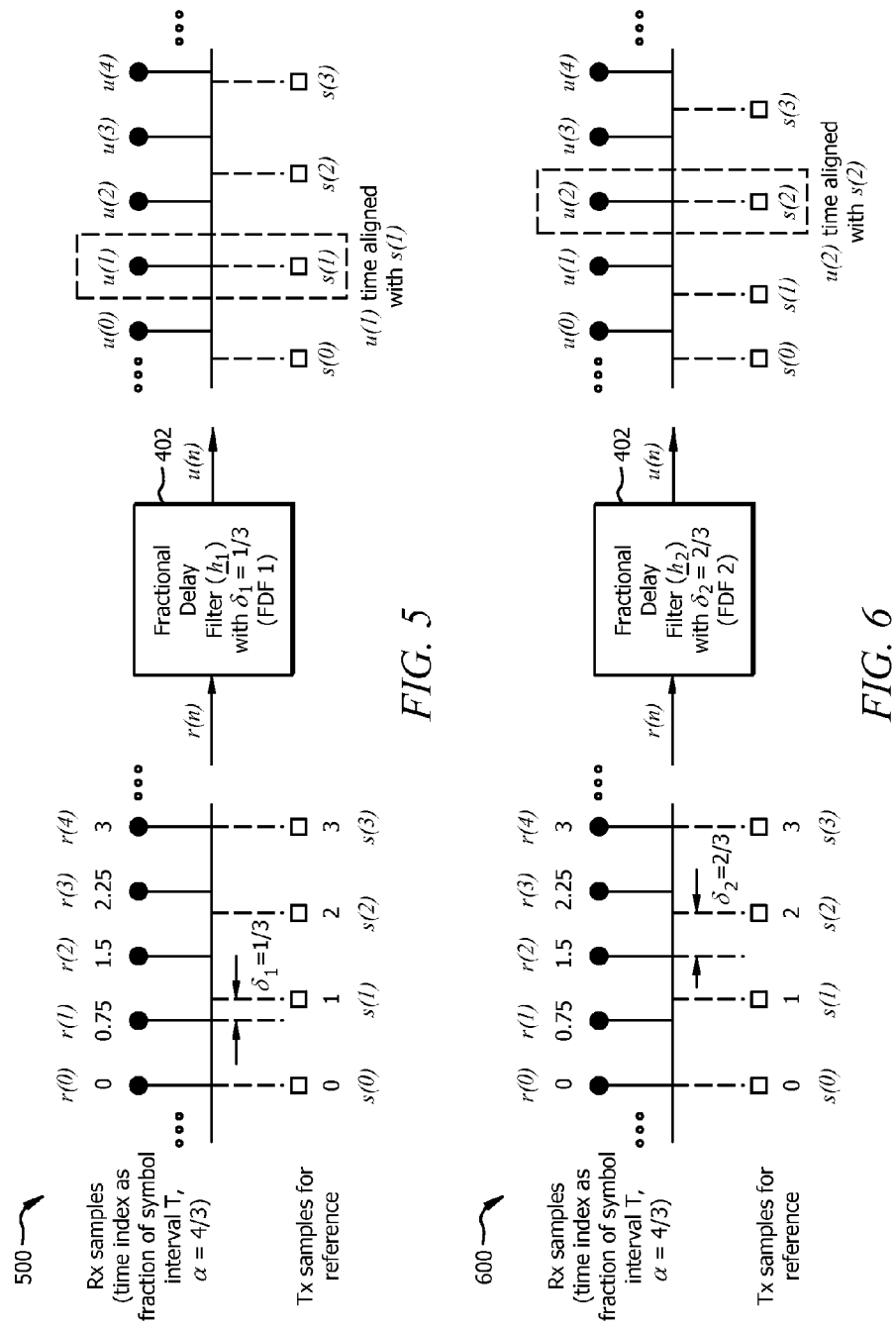

LOW-COMPLEXITY, ADAPTIVE, FRACTIONALLY SPACED EQUALIZER WITH NON-INTEGER SAMPLING

CROSS-REFERENCE TO RELATED APPLICATIONS

The present application claims priority to U.S. Provisional Patent Application No. 61/823,649 filed May 15, 2013 by Syed Faisal Ali Shah et al. and entitled "Low-Complexity, Adaptive, Fractionally-Spaced Equalizer System with Non-Integer Sampling," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The increase in bandwidth demand for optical links, such as links found in long-haul optical networks, is necessitating a rapid increase in the capacity of optical links. For instance, the capacities of optical channels in some optical communication systems are approaching about 100 gigabits per second (Gb/s). Moreover, to meet future capacity demands for optical networks, next generation optical communication systems are being designed to sustain capacities that reach multi-terabits per second (Tb/s). Although the demand to increase bandwidth and throughput continue to grow, designs for the optical systems are often constrained by cost, power, and size requirements. For example, the sampling rates of analog-to-digital converters (ADCs) and subsequent signal processing circuitry may be a limiting factor for increasing the operation speed of optical communication systems.

Typically, coherent optical receivers may utilize oversampling (e.g. the symbol sampling rates are higher than an optical system's baud rate) to enable fractionally spaced equalization of chromatic dispersion (CD) and/or polarization mode dispersion (PMD). In contrast to T-spaced equalizers, fractionally spaced equalizers (FSE) increase the tolerance against sampling phase errors and minimize noise enhancement arising from spectral nulls during aliasing. Specifically, a FSE may avoid noise enhancement by sampling the received signal at a rate higher than the symbol rate to limit the amount of aliasing in the received signal. In addition, an adaptive FSE may correct for sampling phase error on noise enhancement with interpolation. Unfortunately, current FSEs (e.g. T/2 spaced FSEs) may be relatively more complex, consume relatively more power, and/or relatively costly to implement within optical communication systems.

SUMMARY

In one embodiment, the disclosure includes an apparatus comprising a memory; and a processor coupled to the memory, wherein the memory includes instructions that when executed by the processor cause the apparatus to perform the following receive an incoming signal at a sampling rate that is greater than a symbol rate associated with the incoming signal, replicate a plurality of data streams from the incoming signal, apply a plurality of fractional delays for the data streams, and perform an adaptive equalization on a plurality of data blocks generated from the data streams, wherein the fractional delay is applied to the data streams independently of the adaptive equalization, and wherein the adaptive equalization implements taps spaced at a fraction of a symbol interval associated with the incoming signal.

In another embodiment, the disclosure includes a method for implementing non-integer, sub-symbol adaptive equalization at a receiving node, the method comprising receiving N input samples by sampling a received input signal at a non-integer, sub-symbol sampling rate, generating M data streams from the N input samples of the received input signal, applying a fractional delay for each of the M streams except for one of the M streams, and performing an adaptive equalization on one or more data blocks generated from the M streams to produce an output serial data signal, wherein the fractional delay is decoupled from the adaptive equalization applied to the M streams, wherein the adaptive equalization implements taps spaced at a fraction of a symbol interval for the incoming signal, and wherein the non-integer, sub-symbol sampling rate is greater than a symbol rate associated with the input serial data signal and less than two times the symbol rate.

In yet another embodiment, the disclosure includes an apparatus comprising a fractional delay filter (FDF) configured to receive a serial input data with a sampling rate greater than a symbol rate, generate M streams of data from the serial input data, and apply one or more fractional delays to the M streams of data, and an adaptive, fractionally spaced equalizer (AFSE) coupled to the FDF, wherein the AFSE is configured to receive the M streams of data as a plurality of block input data and perform an adaptive equalization on the block input data using a non-integer, sub-symbol sampling, and wherein the fractional delays and the adaptive equalization of the M streams of data are decoupled from each other.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a signal diagram of an embodiment of the FDF component used to align a received input sample with a transmitted output symbol.

FIG. 6 is a signal diagram of an embodiment of the FDF component used to align a received input sample with a transmitted output symbol.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are at least one method, apparatus, and/or system for implementing non-integer, sub-symbol sampling (e.g. oversampling) fractionally spaced equalization at a receiving node. The receiving node may decouple channel equalization functions from fractional delay for time alignment functions in a non-integer, sub-symbol sampling system. The receiving node may comprise a FDF component, a block formation component, and an AFSE that operates with non-integer, sub-symbol sampling. The FDF may be configured to align the received samples with respect to the transmitted symbols using a fractional delay independent of the AFSE. The block formation component may be configured to perform serial-to-parallel (S/P) conversion and form overlapping data blocks as an input to the AFSE. The non-integer, sub-symbol sampling may be represented with the variable $\alpha$, which may range from $1<\alpha<2$ (e.g. a rational number). In other words, the AFSE may perform the non-integer, sub-symbol equalization such that the sub-symbol sampling rate $\alpha/T$ is less than $2/T$, where T represents the symbol time interval. Specifically, the scalar $\alpha$ may be a ratio that can be expressed as $\alpha=N/M$, where N represents a number of samples that correspond to M transmitted symbols. Equalizer tap spacing may be a fraction (M/N) of the symbol time interval T to provide robustness against sampling phase errors. The output for the AFSE may be at a symbol rate of $1/T$, such that for each N input samples, the AFSE produces M outputs.

Figure 1:
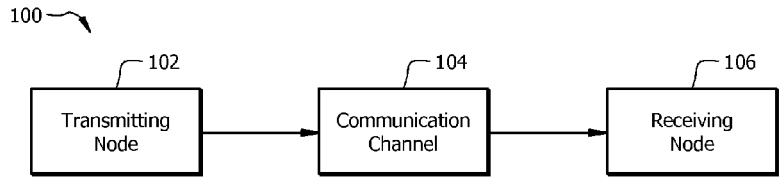
FIG. 1 is a schematic diagram of an embodiment of a communication system where embodiments of the present disclosure may operate.

FIG. 1 is a schematic diagram of an embodiment of a communication system 100 where embodiments of the present disclosure may operate. The communication system 100 may be any communication system that includes, but is not limited to optical networks, wired networks, wireless networks, and/or satellite based communication networks. The communication system 100 may comprise one or more local area networks (LANs), virtual networks, and/or wide area networks (WANs). For example, the communication system 100 may be a data center network. Alternatively, the communication system 100 may be an optical network, such as a Wavelength Division Multiplexing (WDM) network, a coherent dense WDM (DWDM) network, and/or a Synchronous Optical Network (SONET)/Synchronous Digital Hierarchy (SDH) network. FIG. 1 illustrates that the communication system 100 may comprise a transmitting node 102, a communication channel 104, and a receiving node 106.

The transmitting node 102 and the receiving node 106 may communicate with each other over the communication channel 104. The communication channel 104 may couple the transmitting node 102 and the receiving node 106 directly via one or more physical links, such as telephone lines, fiber optic cables, microwave transmission links (e.g. radio frequency (RF) transmission), and electrical links, or indirectly using one or more logical connections or physical links with intervening network nodes. Data signals transported in the communication channel 104 may be sent in the electrical domain, optical domain, or both.

The transmitting node 102 and the receiving node 106 may be any network node configured to exchange data signals. The transmitting node 102 and the receiving node 106 may be network devices that are configured to operate in the electrical domain, the optical domain, or both. The transmitting node 102 and the receiving node 106 may be terminals, transceivers, transponders, regenerators, switches, routers, bridges, and/or any other network devices that are capable of processing optical and/or electrical data signals. In one embodiment, the transmitting node 102 and the receiving node 106 may be coherent optical devices. In FIG. 1, the transmitting node 102 may transmit data signals via the communication channel 104 to reach the receiving node 106. The receiving node 106 may subsequently process and forward the data signal to one or more network nodes within the communication system 100 and/or back to the transmitting node 102 via the communication channel 104.

As persons of ordinary skill in the art are aware, although FIG. 1 illustrates a communication system 100 with a single transmitting node 102, a single communication channel 104, and a single receiving node 106, the disclosure is not limited to only this specific application. For instance, the communication system 100 may comprise a plurality of transmitting nodes 102, a plurality of communication channels 104, and a plurality of receiving nodes 106. The transmitting nodes 102 and the receiving nodes 106 may be interconnected amongst each other to form a plurality of different network topologies. The use and discussion of FIG. 1 is only an example to facilitate ease of description and explanation. Furthermore, throughout the disclosure, the term "symbols" refers to an encoded message within a data signal. The term "symbol rate" and "baud rate" may be interchangeable throughout the disclosure and refer to the number of messages/symbols transmitted per second. Similarly, the terms "sub-symbol sampling rate," "sample rate," and "sampling rate" may be interchangeable throughout the disclosure and refer to the number of samples per second where each sample may be real or complex and may consist of one or more bits. The term "fractional delay" may be represented as the variable $\delta$, and refers to a delay that is equal to a fraction of the symbol time interval (e.g. $0<\delta<1$).

Figure 2:
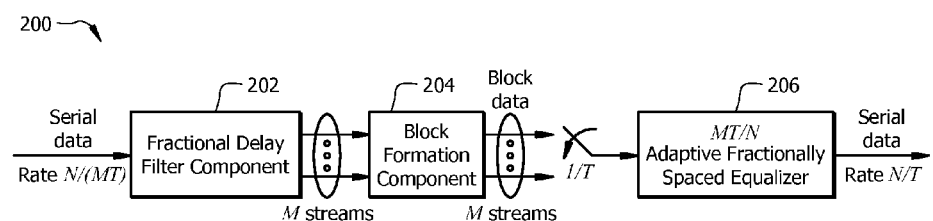
FIG. 2 is a schematic diagram of an embodiment of a FDF based AFSE system within a receiving node.

FIG. 2 is a schematic diagram of an embodiment of a FDF based AFSE system 200 within a receiving node. The FDF based AFSE system 200 depicted in FIG. 2 may operate at relatively lower power and have a relatively smaller form factor. The FDF based AFSE system 200 may operate at a relatively lower power when $\alpha$ (non-integer, sub-symbol sampling) ranges from $1<\alpha<2$. In particular, the relatively lower sub-symbol sampling rate may reduce the ADC sampling rate, which in turn reduces the power consumption of the FDF based AFSE system 200. Additionally, a relatively slower clock for subsequent digital signal processing may also increase power efficiency. Relatively lower power consumption and a relatively smaller form factor may also stem from implementing embodiments of the FDF based AFSE system 200 that consists of a single AFSE 206 per output signal from an ADC. Including only a single AFSE 206 per output signal from an ADC reduces overall complexity with the reduction of the number of AFSEs within the FDF based AFSE system 200. Generally, as the number of equalizer increases, the design complexity also increases for an AFSE system. A capacity increase may also occur because of the relatively lower power and the relatively smaller form factor.

In FIG. 2, the FDF based AFSE system 200 may receive an input serial data at a sample rate of N/(MT). The input serial data may be a digital signal within the electrical domain and may comprise a plurality of input blocks. In one embodiment, an ADC (not shown in FIG. 2) may covert an analog signal received further upstream within the receiving node to output a converted digital signal. The variables N and M may represent integer numbers, where N refers to the number of input samples within an input block that corresponds to the M transmitted symbols that the FDF based AFSE system 200 outputs. For example, if the input signal sample rate is 4/(3T), then four input samples will correspond to three transmitted symbols. The T variable represents the symbol time interval (e.g. in microseconds or nanoseconds) for each of the M transmitted symbols. Typically, the value of variable N is greater than the value of variable M. In one embodiment, the serial sample rate of N/(MT) may be determined by the maximum sampling rate of the ADC.

Figure 4:
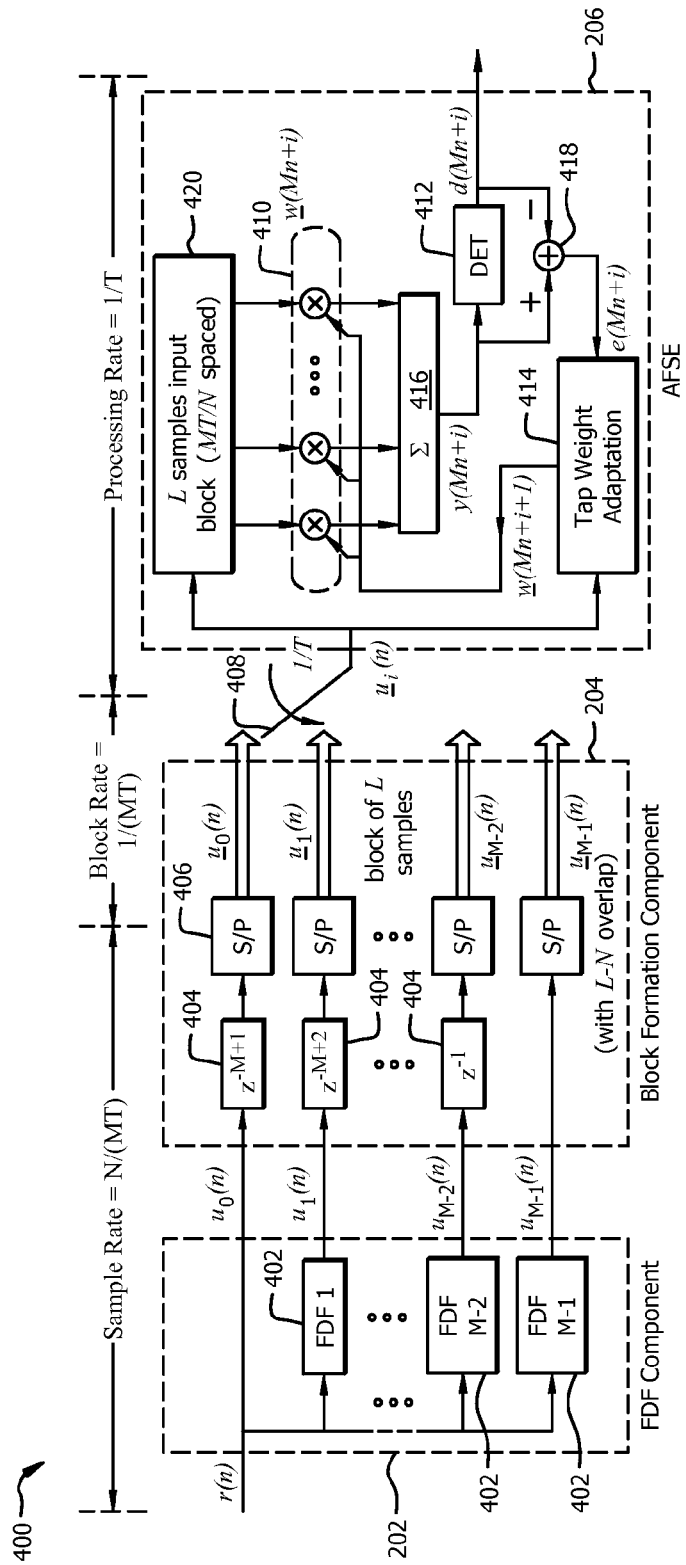
FIG. 4 is a schematic diagram of another embodiment of a FDF based AFSE system within a receiving node.

FIG. 4 illustrates that the FDF based AFSE system 200 may comprise a FDF component 202, a block formation component 204, and an AFSE 206 for non-integer, sub-symbol sampling. The use of non-integer, sub-symbol sampling may cause the channel induced inter-symbol interference (ISI) to vary cyclically from one group of input samples (e.g. N input samples) to the next group of input samples. The FDF based AFSE system 200 may decouple the channel induced ISI equalization functions from the fractional delay functions for time alignment. To overcome ISI caused by non-integer, sub-symbol sampling, the FDF component 202 may precede the AFSE 206, as shown in FIG. 2. The FDF component 202 may comprise a group of M−1 fixed-coefficient FDFs. The variable M is equal to the number of transmitted symbols for each input block of N samples. Each of the fixed-coefficient filters may introduce a fixed fractional delay for the input samples in order to align the input samples with respect to the transmitted symbols. The FDF component 202 may generate fractional delays independently from the AFSE 206. The block formation component 204 may be configured to buffer the output from the FDF component 202, perform S/P conversion on the output of the FDF component 202, and form data blocks for each of the M streams output from the FDF component 202. The data blocks may be formed with overlapping samples for each of the M streams.

The AFSE 206 may sequentially process each of the incoming data blocks from the block formation component 204 at a rate 1/T. Data may not have been up sampled and/or re-sampled prior to the AFSE 206 receiving the incoming data blocks and after the FDF component 202 receives the input serial data. The sampling rate may remain N/(MT) throughout the FDF based AFSE system 200 until reaching the AFSE 206. The AFSE 206 may be a time domain equalizer or a frequency domain equalizer. The sample spacing within each block of input data may remain at MT/N or T/α spaced in order to process fractionally-spaced input data. The AFSE 206 may be configured for non-integer, sub-symbol sampling ratio α that may have a ratio of the number of input samples in a group (e.g. represented by variable N) over the corresponding number of transmitted symbols (e.g. represented by variable M) in the group. Recall that the non-integer, sub-symbol sampling ratio α may have a range from 1<α<2. Other embodiments of the FDF based AFSE system 200 may be configured to have the non-integer, sub-symbol sampling ratio α at values greater than about two. The AFSE 206 may output the serial data at a symbol rate of 1/T, such that, for each of the N input samples, the AFSE 206 produces M output symbols.

In one embodiment, to achieve low complexity, the FDF based AFSE system 200 may comprise a single AFSE 206 for each ADC and/or each output signal from an ADC within a receiving node. In other words, a receiving node may have a 1:1 ratio between an AFSE 206 and an ADC and/or an ADC output signal. By decoupling the channel equalization functions from the fractional delay functions, a single AFSE 206 may be used to process the M streams, which is generated from a received digital signal from an ADC. Generally, as the number of equalizers increase, the FDF based AFSE system 200 may increase in design complexity. The use of a single AFSE 206 may also maintain the length of training symbols to be relatively low and/or unchanged because additional training symbols may be used to train each additional AFSE 206. Furthermore, the AFSE 206 may operate at a symbol rate of 1/T to equalize impairments from the communication channel. The equalizer tap spacing may be a fraction (M/N) of the symbol interval T to provide robustness against sampling phase errors.

Figure 3:
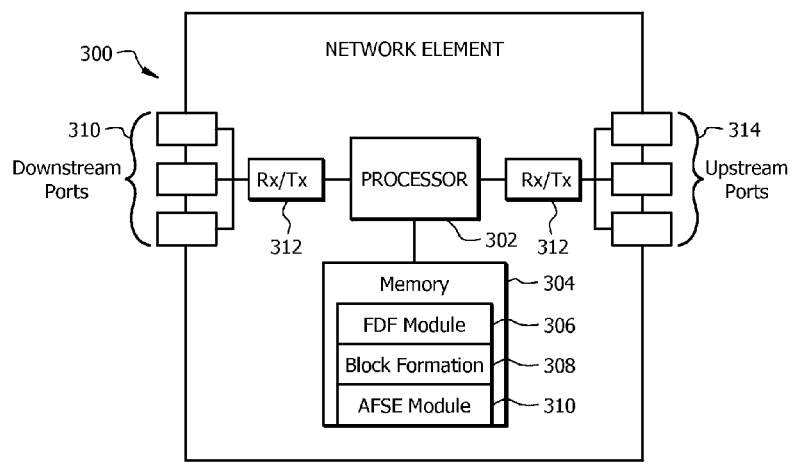
FIG. 3 is a schematic diagram of an embodiment of a network element capable of performing fractionally-spaced adaptive equalization with non-integer, sub-symbol sampling within a receiving node.

At least some of the features/methods described in the disclosure may be implemented in a network element. For instance, the features/methods of the disclosure may be implemented using hardware, firmware, and/or software installed to run on hardware. FIG. 3 is a schematic diagram of an embodiment of a network element 300 that may be capable of performing fractionally-spaced adaptive equalization with non-integer, sub-symbol sampling within a receiving node. The network element 300 may be any apparatus and/or network node configured to receive a data signal and perform oversampling. For example, network element 300 may be a receiving node, such as a coherent optical receiver, a router, a switch, and/or any other network node configured to receive and process electrical and/or optical signals at the physical layer. The terms network "element," network "node," network "component," network "module," network "device," and/or similar terms may be interchangeably used to generally describe a network device and do not have a particular or special meaning unless otherwise specifically stated and/or claimed within the disclosure.

The network element 300 may comprise one or more downstream ports 310 coupled to a transceiver (Tx/Rx) 312, which may be transmitters, receivers, or combinations thereof. The Tx/Rx 312 may transmit and/or receive frames from other network nodes via the downstream ports 310. Similarly, the network element 300 may comprise another Tx/Rx 312 coupled to a plurality of upstream ports 314, wherein the Tx/Rx 312 may transmit and/or receive frames from other nodes via the upstream ports 314. The downstream ports 310 and/or upstream ports 314 may include electrical and/or optical transmitting and/or receiving components. In one embodiment, the Tx/Rx 312 may transmit and/or receive data (e.g., packets) from other network elements wirelessly via one or more antennas. For example, the antennas may be multiple-input-multiple-output (MIMO) antennas and may be configured to send and receive orthogonal frequency-division multiple access (OFDMA) signals or wireless fidelity (Wi-Fi) signals.

A processor 302 may be coupled to the Tx/Rx 312 and may be configured to process the frames and/or determine which nodes to send (e.g. transmit) the frames. In one embodiment, the processor 302 may comprise one or more multi-core processors and/or memory modules 304, which may function as data stores, buffers, etc. The processor 302 may be implemented as a general processor or may be implemented as one or more application specific integrated circuits (ASICs), field programmable gate arrays (FPGAs), and/or digital signal processors (DSPs). Although illustrated as a single processor, the processor 302 is not so limited and may comprise multiple processors. The processor 302 may be configured to implement any of the schemes described herein, including method 900.

FIG. 3 illustrates that the memory module 304 may be coupled to the processor 302 and may be a non-transitory medium configured to store various types of data. Memory module 304 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 304 may be used to house the instructions for carrying out the system and methods described herein, e.g. method 900. The memory module 304 may comprise a FDF module 306, a block formation module 308, and an AFSE module 310 that may be implemented on the processor 302. Alternately, the FDF module 306, the block formation module 308, and the AFSE module 310 may be implemented directly on the processor 302. The FDF module 306 may be configured to align the input samples with respect to the transmitted symbols by introducing a fractional delay. The block formation module 308 may be configured to perform S/P conversion and form data blocks from each of the M streams. The AFSE module 310 may be configured to adaptively perform equalization to compensate for communication channel impairments. The FDF module 306 may be decoupled from the ASFE module 310. Functions performed by the FDF module 306, the block formation module 308, and the AFSE module 310 will also be disclosed in FIGS. 4-9.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires and optical fibers) or a wireless communication line.

It is understood that by programming and/or loading executable instructions onto the network element 300, at least one of the processor 302, the cache, and the long-term storage are changed, transforming the network element 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

FIG. 4 is a schematic diagram of another embodiment of a FDF based AFSE system 400 within a receiving node. The FDF component 202 may comprise a plurality of FDFs 402. An FDF 402 may be a finite impulse response (FIR) filter, infinite impulse response (IIR) filter, and/or any other suitable signal processing module that is capable of introducing fractional delay in a digital signal. In one embodiment, the FDFs 402 may be FIR filters as described in T. I. Laakso, et al., "Splitting the unit delay: Tools for fractional delay filter design," IEEE Signal Processing Magazine, Vol. 13, No. 1, 1996 ("Laakso"), which is incorporated by reference in its entirety. In particular, the disclosed technique may employ Laakso's approach for the design of FIR FDFs based on the interpolation filter reported in G. Oetken, "A new approach for the design of digital interpolating filters," IEEE Trans. Acoust. Speech Signal Processing, Vol. 27, No. 6, 1979, which is incorporated by reference in its entirety. As such, the FDF 402 may be based on a prototype, half-band filter of length 2K with equi-ripple characteristics such that the zeroes of its error function are used to solve a set of K linear equations for filter coefficients at a specified delay $\delta_i$. The prototype, half-band filter is designed using the Parks-McClellan algorithm for equi-ripple characteristics as described in James McClellan and Thomas Parks, "A Personal History of the Parks-McClellan Algorithm," IEEE Signal Processing Magazine, Vol. 22, No. 2, 2005, which is incorporated by reference in its entirety. In another embodiment, the FDF 402 may be FIR filters configured to perform Lagrange polynomial interpolation which may be suitable if the bandwidth of the underlying signal is commensurate with the Lagrange polynomial interpolation filter frequency response. Other filters or systems known by persons of ordinary skill in the art may be used as FDFs 402.

The FDF component 202 may replicate the received input samples, r(n), which are received at a rate N/(MT), into M number of branches. The variable n refers to the sample of data received as an input for the FDF based AFSE system 400. The variable i within this disclosure may refer to a specific replicated branch from the M number of branches, and may have a range from about zero to M−1. For example, the first branch is referenced as i=0 branch, the second branch is referenced as i=1 branch, and so forth. Except for the first branch (i=0), the other M−1 branches may comprise an FDF 402 that applies a fractional delay. The $n^{th}$ sample of the serial output data from the $i^{th}$ branch of the FDF component 202 may be referenced as $u_i(n)$.

In general, the FDF 402 in the $i^{th}$ branch may introduce a fractional delay of $\delta_i=(\alpha-1)i$ for i=1 to M−1. In FIG. 4, the FDF 402 in the second branch (i=1) is labeled as FDF 1 and may introduce a delay of $\delta_1=\alpha-1$. The FDF 402 in the third branch (i=2) is labeled as FDF 2 and may introduce a delay of $\delta_2=2\alpha-2$, and so forth until the M−1 branch and the FDF M−1. The fractional delay $\delta_i$ may be a fixed rational number that differs for each of the FDF 402. Aligning the input samples with corresponding transmitted symbols are discussed in more detail in FIGS. 5 and 6. The FDF component 202 subsequently outputs the samples to the block formation component 204 as M different output streams. FIG. 4 illustrates the M different output streams for the $n^{th}$ block of the serial input data as $u_i(n)$ (e.g. $u_0(n)$ through $u_{M-1}(n)$).

The block formation component 204 may process each of the M output streams from the FDF component 202 to form M streams of output block data. FIG. 4 illustrates the M streams of output block data as $\underline{u}_i(n)$ (e.g. $\underline{u}_0(n)$ through $\underline{u}_{M-1}(n)$). Each of the M streams of output block data may have a length of L samples where the variable L represents the number of coefficients within the adaptive filter of the AFSE 206. In other words, the variable L may represent the length of the AFSE 206. Each branch in the block formation component 204 may comprise a delay element 404 with branch dependent integer delay, followed by a S/P converter 406. As shown in FIG. 4, the delay element 404 is described in terms of z-transform delay where $z^{-1}$ refers to a unit sample delay. Other types of integer sample delays known by persons of ordinary skill in the art may be used for the delay element 404. The delay element 404 in the first branch may introduce a delay of M−1 samples when the sample rate is N/(MT). The delay element in the $i^{th}$ branch may introduce a delay of M−1−i. The delay in each branch may be used to maintain the position of the desired sample at a fixed point within a block. As shown in FIG. 4, the last branch (i=M−1) may not comprise a delay element 404.

The M output streams from the FDF component 202 reach the S/P converters 406 after traversing through the delay elements 404. The S/P converter 406 in each branch may form blocks that comprise L samples. Recall that the variable L represents the number of coefficients within the adaptive filter of the AFSE 206, which may also be referred to as the length of the AFSE 206. The length of the AFSE 206 may be dictated by the channel conditions and typically range from about 10 to 20. The S/P converter 406 may form blocks with an overlap of L-N samples from the previous block so that each block has N new samples. The overlapping of N samples may reduce the block rate to 1/(MT) when the input sampling rate is N/(MT). Overlapping of the blocks will be discussed in more detail in FIG. 7.

The output of the block formation component 204 may be connected to the AFSE 206 through a commutator 408. The commutator 408 may be any type of electrical switch (e.g. transistors) configured to sequentially tap the block data from one of the M streams of output block data $\underline{u}_i(n)$ (e.g. $\underline{u}_0(n)$ through $\underline{u}_{M-1}(n)$) of the block formation component 204 as an input block data for the AFSE 206. The commutator 408 may cycle through the M streams of output block data $\underline{u}_i(n)$ (e.g. $\underline{u}_0(n)$ through $\underline{u}_{M-1}(n)$) at symbol rate 1/T that is about equivalent to the block rate of 1/(MT) from individual streams. FIG. 4 references the $n^{th}$ block of input data from the $i^{th}$ branch of the block formation component 204 as $\underline{u}_i(n)$. The cycled through M streams of the input block data may be processed by the AFSE 206 that may perform fractionally spaced channel equalization with non-integer, sub-symbol sampling.

The AFSE 206 may comprise an L samples input block tap delay line 420, a filter tap weight component 410, an adder 416, a demodulator 412, a comparator 418 and a tap weight adaptation component 414. The AFSE 206 may be configured as an FIR and/or IIR adaptive filter that may operate in block mode. The L samples input block tap delay line 420 may receive and feed the block data from the block formation component 204 into the filter tap weight component 410. The filter tap weight component 410 may comprise L different filter coefficients to equalize the block data received from the L samples input block tap delay line 420. The L samples input block tap delay line 420 may space out the samples such that the samples within the block data are MT/N spaced. If $\underline{w}(Mn+i)=[w_0(Mn+i)\ldots w_{L-1}(Mn+i)]^T$ is a L×1 vector of the filter tap weights for the $n^{th}$ block of input data from the $i^{th}$ branch of the block formation component 204, then the soft output from the adder 416 is described in equation 1:

$$y(Mn+i)=\underline{u}_i^H(n)\underline{w}(Mn+i) \text{ for } i=0 \text{ to } M-1 \qquad (1)$$

The variable y(Mn+i) in equation 1 may represent the soft output for the $n^{th}$ block of input data from the $i^{th}$ branch of the block formation component 204. Also, the superscript $^H$ in equation 1 represents a vector conjugate transpose operation. As shown in FIG. 4, the filter tap weight component 410 may comprise one or more sets of filter tap weights that may be updated completely or partially where a subset of L filter tap weights are updated during each weight adaptation iteration.

In FIG. 4, the adder 416 may produce a soft output (e.g. y(Mn+i)) that passes through the demodulator 412. The demodulator 412 may be a slicer that acts as a hard decision device that produces a corresponding output of d(Mn+i) based on the signal modulation method. The variable d belongs to a finite set of real and/or complex numbers determined by the signal modulation method. The output from the demodulator 412 and the output from the adder 416 may be fed as an input into the comparator 418 to determine an error signal given by e(Mn+i)=y(Mn+i)−d(Mn+i), where the variable e represent an error signal. The equalizer tap weights vector w may be updated based on any weight adaptation algorithm within the tap weight adaptation component 414. For example, in case of the least mean square (LMS) tap weight update algorithm, the tap weight adaptation component 414 for the next iteration to process the $n^{th}$ block from the $(i+1)^{th}$ branch) is described in equation 2:

$$\underline{w}(Mn+i+1)=\underline{w}(Mn+i)+\mu e^*(Mn+i)\underline{u}_i(n) \text{ for } i=0 \text{ to } M-1 \qquad (2)$$

Recall that e(Mn+i) may represent the error signal, the superscript * may represent a scalar conjugate operation, and μ may represent the step size of the LMS algorithm. Since the tap weights $\underline{w}(Mn+i)$ from $i^{th}$ branch may be used to compute the tap weights $\underline{w}(Mn+i+1)$ for the $(i+1)^{th}$ branch, a single adaptive filter may be used to process each of the M branches. The equalizer tap weights within the AFSE 206 may also be adapted or updated at a rate 1/T using any appropriate method of tap weight update known by persons skilled in the art, such as LMS and recursive least squares (RLS) method.

As shown in FIG. 4, the FDF based AFSE system 400 may provide a means of introducing fractional delay between the received input samples and the transmitted symbols when non-integer, sub-symbol sampling is used. Assuming that the $n^{th}$ received sample, r(n), is time aligned with the sent symbol s(n), in principle, a block of L samples, $r(n)=[r(n-L/2+1/2) \ldots r(n) \ldots r(n+L/2-1/2)]^T$, may be used to estimate s(n) using a linear equalizer with tap weights $\underline{w}=[w(0) \ldots w(L-1)]$. The superscript $^T$ may represent the vector transpose operation. However, the subsequent block of L samples consisting of $\underline{r}(n+1)=[r(n-L/2+3/2) \ldots r(n+1) \ldots r(n+L/2+1/2)]$ may not be time aligned with s(n+1) because s(n+1) and r(n+1) may have a fractional delay of $\delta_1=\alpha-1$. Thus, r(n+1) may use a linear equalizer with different tap weights, $\underline{w}'$, to correct for fractional delay as well as channel-induced ISI. Since the fractional delay between s(n+1) and r(n+1) is known a priori, the channel-induced ISI and fractional delay may not need to be jointly equalize through an adaptive equalizer. Furthermore, the fractional delay between s(n+i) and r(n+i) is a function of i such that $\delta_i=(\alpha-1)i$ for i=1 to M−1 and the joint equalization of fractional delay and ISI requires M different equalizers. FDF based AFSE system 400 may lower the complexity in a relative sense using an AFSE 206 and M−1 fixed coefficient FDFs 402 that introduces the fractional delay $\delta_i$ to align s(n+i) and r(n+i).

FIG. 5 is a signal diagram of an embodiment of the FDF component 500 used to align a received input sample with a transmitted output symbol. The FDF component 500 may comprise a FDF 402, which corresponds to the FDF 1 shown in FIG. 4. FDF 1 provides a fractional delay for the second branch (i=1). In FIG. 5, the received input signal may be up-sampled by a non-integer, sub-symbol sampling ratio α=4/3. In other words, there may be four received input samples, r(0), r(1), r(2) and r(3), for every three transmitted symbols, s(0), s(1) and s(2), where s(n) may represent the transmitted symbol at time nT. The up-sampling may be implemented by an ADC further upstream and may not be implemented by the FDF component 500. Without loss of generality, it may be assumed that r(0) is time aligned with s(0). However, r(1) may not be time-aligned with s(1) and may represent an interpolated value at time t=0.75T between s(0) and s(1). In order to time align r(1) with s(1), the sequence of received samples may need to be delayed by $\delta_1=(1−0.75)/(0.75)=1/3$. To accomplish this, the FDF may be designed using Laakso's approach as described earlier to introduce a delay of $\delta_1=1/3$ such that the filter output $u_1(1)$ may be time aligned with s(1).

FIG. 6 is a signal diagram of an embodiment of the FDF component 600 used to align a received input sample with a transmitted output symbol. The FDF component 500 may comprise a FDF 402 that provides a fractional delay for the third branch (i=2). Similar to FIG. 5, the received input signal in FIG. 6 is up-sampled by a non-integer, sub-symbol sampling ratio α=4/3 (e.g. from an ADC). As shown in FIG. 6, r(2) may represent an interpolated value at time t=1.5T between s(1) and s(2). To time align r(2) with s(2), the sequence of received samples may need to be delayed by $\delta_2=(2−1.5)/(0.75)=2/3$. To accomplish this, the FDF component 600 may be designed to introduce a delay of $\delta_2=2/3$ such that the filter output $u_2(2)$ may be aligned with s(2). In general, if $\underline{h}_i=[h_i(0) \ldots h_i(2K-1)]^T$ is a vector of filter coefficients for the FDF 402 of FIG. 4 in the $i^{th}$ branch that introduces a delay of $\delta_i$ in the received samples, then the output of the filter can be described using equation 3:

$$u_i(n)=\Sigma_{p=0}^{2K-1}h_i(p)r(n-p+K) \quad (3)$$

Recall that r(n) in equation 3 may represent the received input sample at time instant n and the variable 2K refers to the number of filter coefficients of FDF 402 or the length of FDF 402. Also, $h_i(p)$ in equation 3 may represent the $p^{th}$ coefficient of the FDF 402 located in the $i^{th}$ branch. The FDF 402 may operate at a sample rate of N/(MT).

Figure 7:
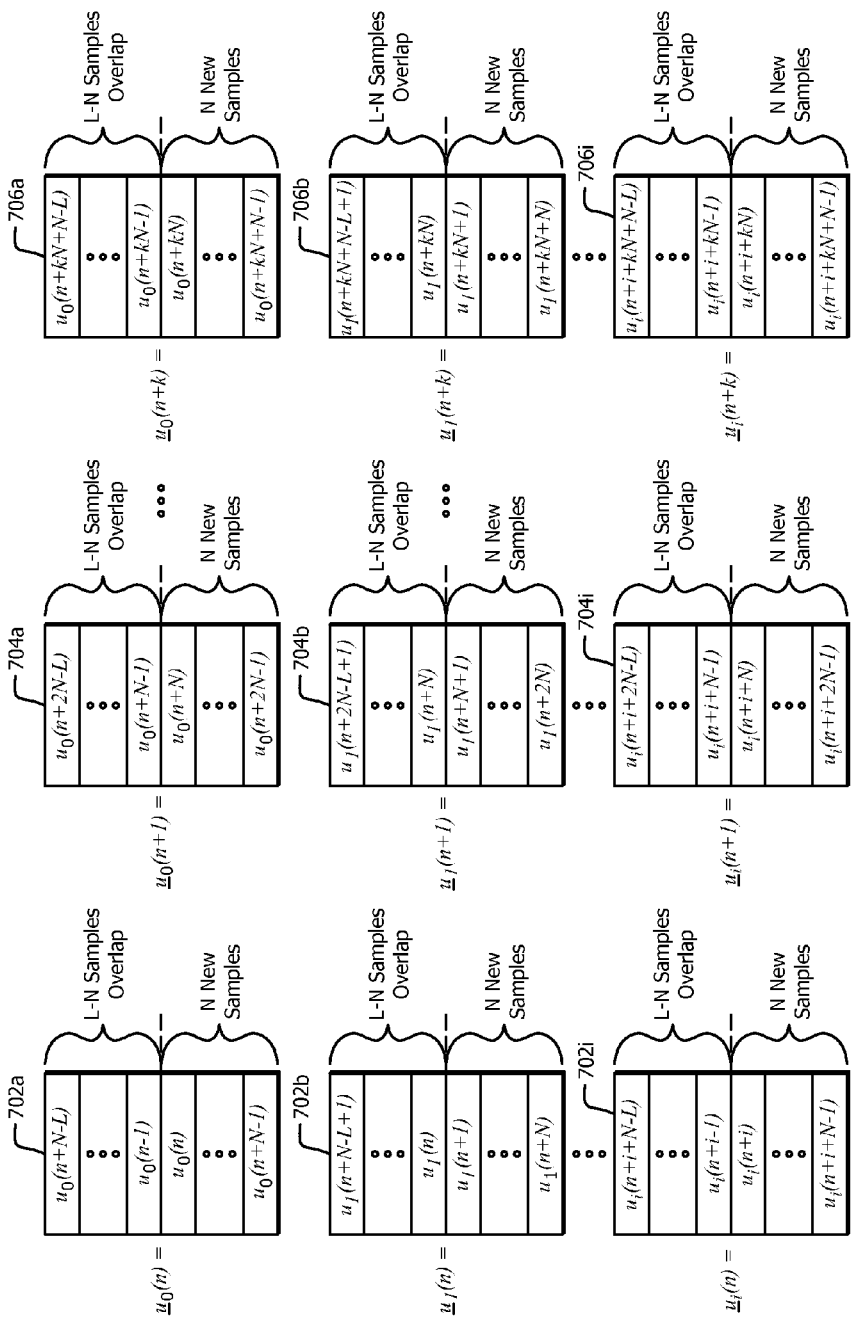
FIG. 7 is a signal diagram of an embodiment of the blocks of data formed at the block formation component.

FIG. 7 is a signal diagram of an embodiment of the blocks of data formed at the block formation component 204 shown in FIGS. 2 and 4. FIG. 7 illustrates that the output blocks 702a-702i represents the output blocks for the different branches (e.g. i=0 to i=M−1) of the $n^{th}$ block; output blocks 704a-704i represents the output blocks for the different branches of the $(n+1)^{th}$ block; and output blocks 706a-706i represents the output blocks for the different branches of the $(n+k)^{th}$ block. The block formation component may generate output blocks 702, 704, and 706 that overlaps for different branches at different time instants (e.g. $n^{th}$ block vs. $(n+1)^{th}$ block). For example, for each of the M branches, blocks 704 (e.g. 704b) may have L-N samples that overlaps with the previous blocks 702 from the corresponding branch (e.g. 702b) in a previous time instant. Blocks 704 may have N new samples or non-overlapping samples that do not overlap with the previous blocks 702 for the same branch (e.g. i=1).

In general, $\underline{u}_i(n)$ may represent the $n^{th}$ block of L samples from the $i^{th}$ branch of the block formation component 204 and may be expressed by equation (4):

$$\underline{u}_i(n)=[u_i(n+i+N-L) \ldots u_i(n+i-1),u_i(n+i) \ldots u_i(n+i+N-1)]^T \text{ for } i=0 \text{ to } M-1 \quad (4)$$

Recall that $u_i(n+i)$ may represent the input sample at the $i^{th}$ branch of the block formation component 204 at $(n+i)^{th}$ time instant and the superscript $^T$ represents a vector transpose operation. Similarly, the $(n+1)^{th}$ block from the $i^{th}$ branch of the block formation component may be represented by equation 5:

$$\underline{u}_i(n+1)=[u_i(n+i+2N-L) \ldots u_i(n+i+N-1)u_i(n+i+N) \ldots u_i(n+i+2N-1)]^T \quad (5)$$

Equations 4 and 5 may show an overlap of L-N samples between $\underline{u}_i(n)$ and $\underline{u}_i(n+1)$. Using FIG. 7 as an example, assuming that n has a value of about 10, N has a value about 4 and L has a value of about 10, for the first branch (i=0) or block 702a, $\underline{u}_0(10)=[u_0(4) \ldots u_0(9), u_0(10) \ldots u_0(13)]^T$. At the next time instant, the $(n+1)^{th}$ block for the first branch (i=0) or block 704a is $\underline{u}_0(11)=[u_0(8) \ldots u_0(13), u_0(14) \ldots u_0(17)]^T$. The top portion of block 704a, $u_0(8) \ldots u_0(13)$, are repeated samples already found in block 702a while the bottom portion of block 704a, $u_0(14) \ldots u_0(17)$, are new samples not found in block 702a. FIG. 7 also illustrates that the $(n+k)^{th}$ block from the $i^{th}$ branch of the block formation component may be represented by equation 6:

$$\underline{u}_i(n+k)=[u_i(n+i+kN+N-L) \ldots u_i(n+i+kN-1)u_i(n+i+kN) \ldots u_i(n+i+kN+N-1)]^T \quad (6)$$

The $(n+k)^{th}$ block from the $i^{th}$ branch of the block formation component may have L-N samples that overlap with the $(n+k-1)^{th}$ block. The samples within a block are MT/N spaced, which is the same as the input sample spacing.

Figure 8:
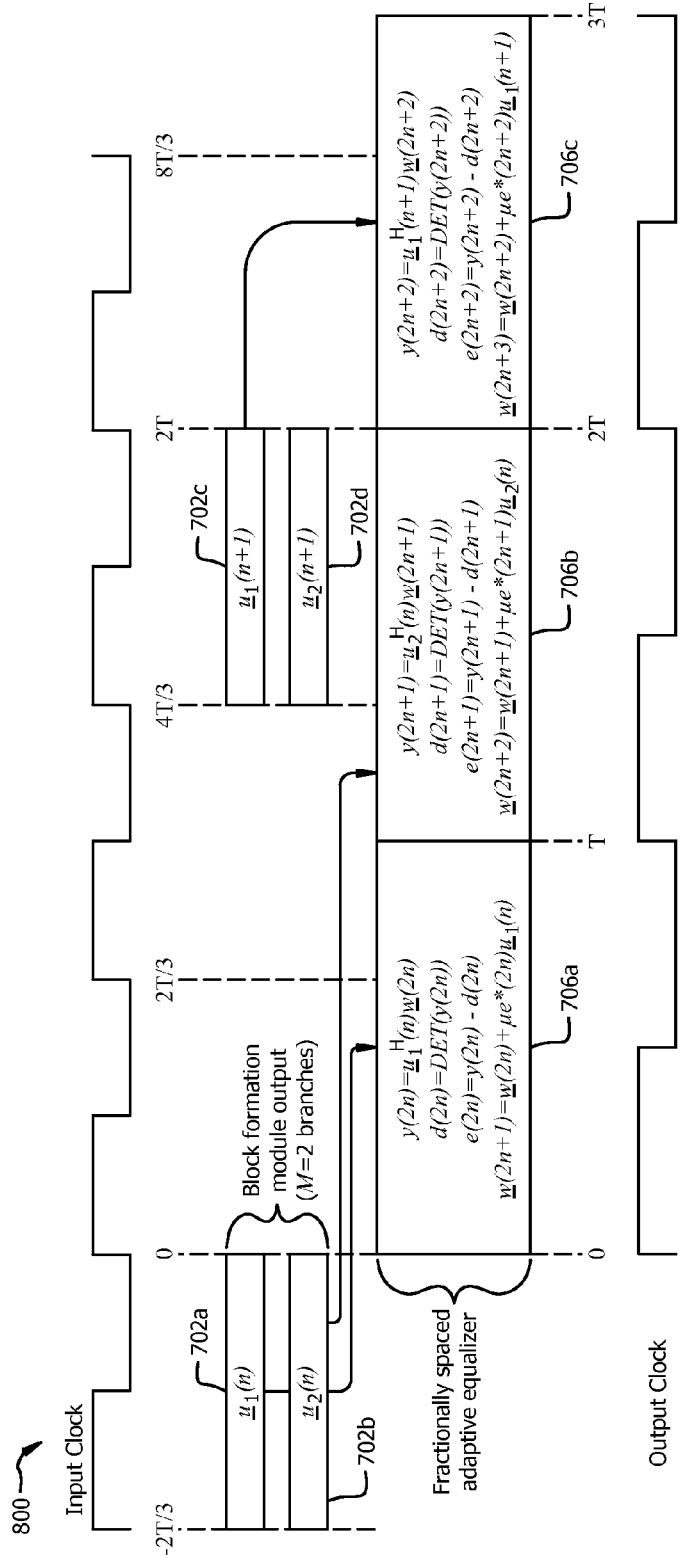
FIG. 8 is a timing diagram that illustrates the relationship between the block formation component and the AFSE.

FIG. 8 is a timing diagram 800 that illustrates the timing relationship between the block formation component 204 and the AFSE 206 of FIG. 4. In particular, FIG. 8 illustrates the timing relationship between the block outputs from the block formation component 204 and the processing done at the AFSE component 206 as described in FIG. 4 for input sampling rate of 2/(3T). In FIG. 8, the block formation component may have two branches (M=2) and the output sample rate may be 1/T. Assuming that at time t=−2T/3 each branch of the block formation component produces a block of data $\underline{u}_1(n)$ and $\underline{u}_2(n)$, at time t=0 the equalizer may tap the input block 702a and produce a soft output y(2n) and a hard decision output d(2n) within the AFSE block 706a. The adaptive filter algorithm may also update the filter tap weights to $\underline{w}(2n+1)$ for the next iteration within the AFSE block 706a. At the next output clock or at time t=T, the AFSE may tap the input block 702b and produce y(2n+1) by using the tap weights $\underline{w}(2n+1)$ produced in the previous iteration within AFSE block 706b. After three input clock cycles or at time t=4T/3, the block formation component may have buffered N=3 new samples of the received signal and produced two new input data blocks 702c ($\underline{u}_1(n+1)$) and 702d ($\underline{u}_2(n+1)$). The input data block 702c may correspond to the AFSE block 706c during the next iteration. The cycle may continue, and the equalizer may produce M=2 equalized symbols for every N=3 input samples of the received signal.

Figure 9:
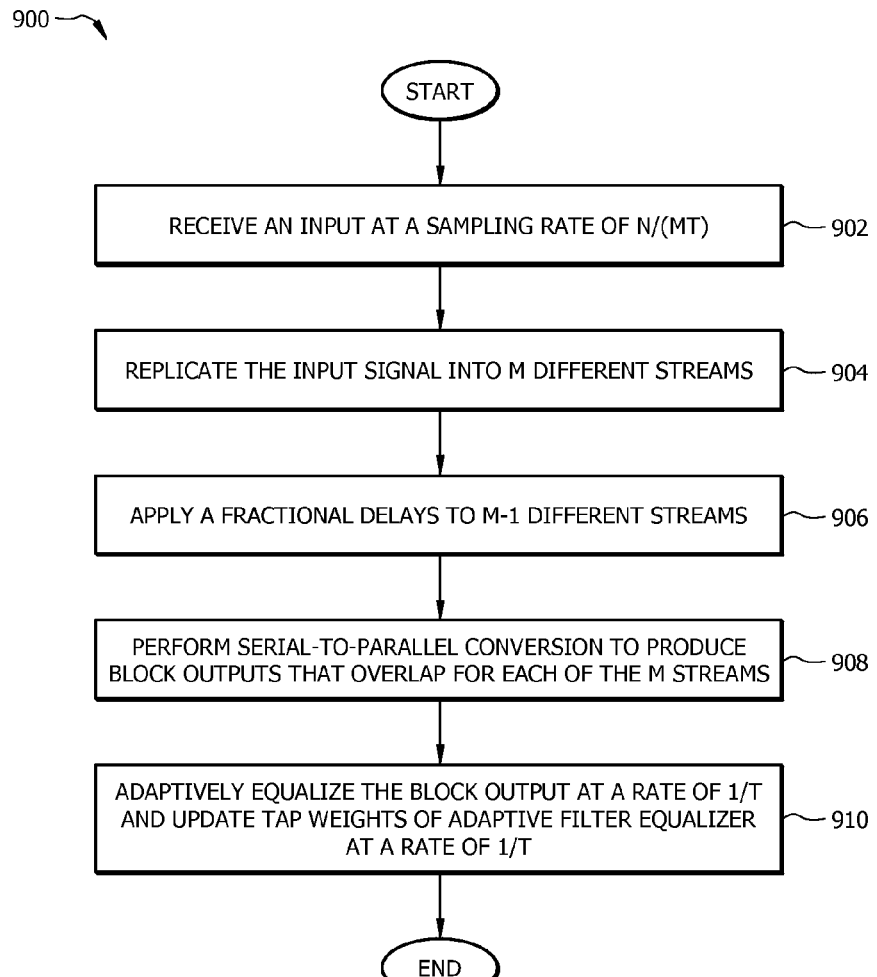
FIG. 9 is a flowchart of an embodiment of a method to perform non-integer, sub-symbol fractionally spaced adaptive equalization.

FIG. 9 is a flowchart of an embodiment of a method 900 to perform fractionally spaced adaptive equalization when non-integer, sub-symbol sampling is used. Method 900 may be implemented by a receiving node that decouples equalization and fractional delay for time alignment. Method 900 may start at step 902 and receive an input signal at a sampling rate of N/(MT). The input samples may comprise a plurality of input blocks. The variables N and M may be integers, where N represents a number of input samples within an input block that correspond to M transmitted symbols. T may represent the symbol time interval. Method 900 may then move to step 904 and replicate the input signal into M different streams. The M different streams correspond to the different branches discussed in FIG. 4 (e.g. i=0). Method 900 may then continue to step 906 to apply fractional delays to M−1 different streams. For example, method 900 may not apply a fractional delay for the first stream or the first branch (e.g. i=0). Afterwards, method 900 may perform a S/P conversion in step 908 to produce block outputs of L samples that overlap for each of the M different streams. Each of the output blocks comprises L-N samples that overlap with the previous input block and N new samples of the current input block. Method 900 may then move to step 910 to equalize the block output at a rate of 1/T. At step 910, method 900 may adaptively equalize the received input blocks that contain MT/N fractionally spaced samples and may subsequently update the equalizer tap weights for the next received input block from step 908.

Figure 10:
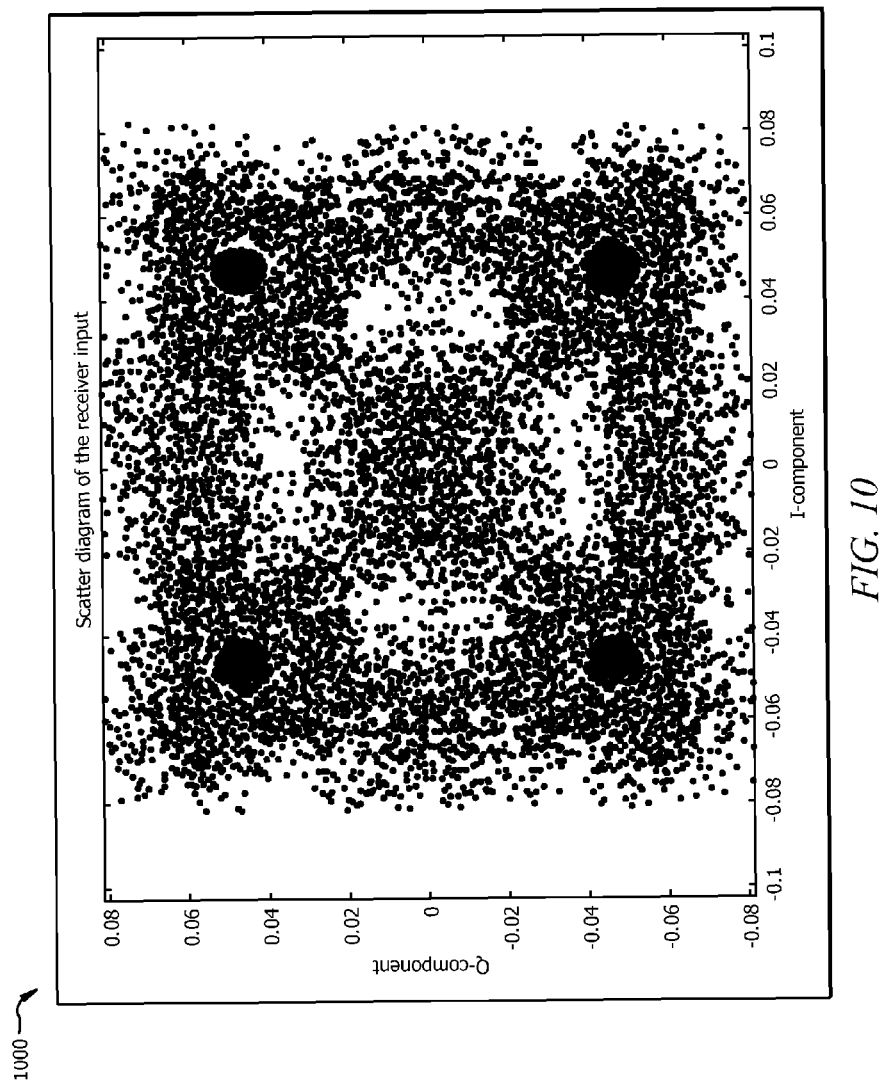
FIG. 10 is in-phase/quadrature (IQ) scatter diagram of an AFSE system input signal.
Figure 11:
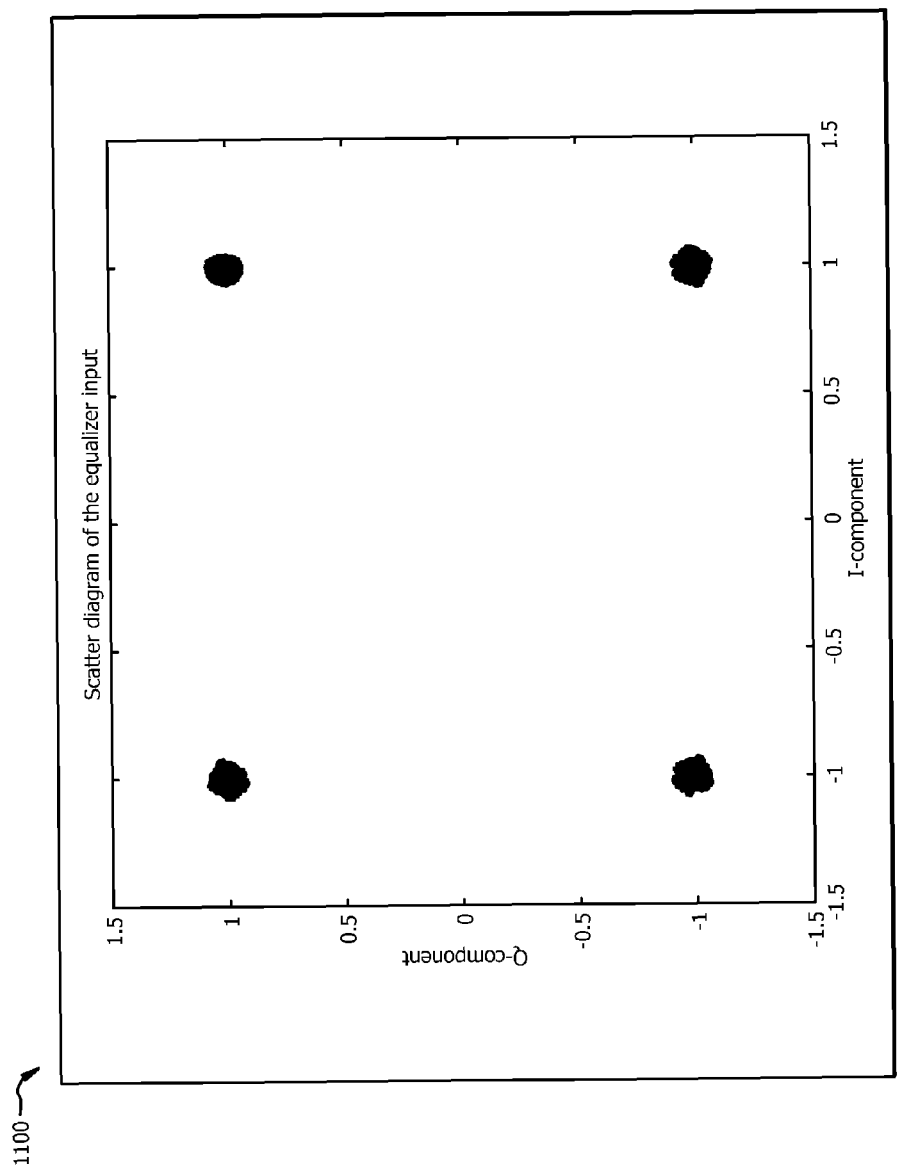
FIG. 11 is an IQ scatter diagram of an AFSE system output signal.

FIGS. 10 and 11 are IQ scatter diagrams 1000 and 1100 of an AFSE system input signal and output signal, respectively. Using FIG. 4 as an example the receiver input signal may correspond to the input serial data received by the FDF in FIG. 2. The receiving node may utilize a quadrature phase-shift keying (QPSK) modulation and a raised-cosine, pulse-shaping filter with about 20% excess bandwidth. As described earlier, the input serial data may contain ISI from the communication channel as well as cyclic ISI originating from non-integer sub-symbol sampling. The combined ISI may distort the QPSK constellation as shown in FIG. 10. FIG. 11 illustrates the IQ scatter diagram of the AFSE output sequence once the equalizer is converged and the constellation distortion shown in FIG. 10 has been minimized. Specifically, the receiving node may sample the received signal with non-integer, sub-symbol sampling at rate 5/(4T) such that M=4 and N=5. The FDF may be an equi-ripple FIR FDF of length 2K=10, and the length of the adaptive equalizer may be L=9 to produce the IQ scatter diagram of the AFSE output sequence.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a memory; and
a processor coupled to the memory, wherein the memory includes instructions that when executed by the processor cause the apparatus to perform the following:
receive an incoming signal at a sampling rate that is greater than a symbol rate associated with the incoming signal;
replicate a plurality of data streams from the incoming signal;
apply a plurality of fractional delays for the data streams; and
perform an adaptive equalization on a plurality of data blocks generated from the data streams,
wherein the fractional delay is applied to the data streams independently of the adaptive equalization, and
wherein the adaptive equalization implements taps spaced at a fraction of a symbol interval associated with the incoming signal.

2. The apparatus of claim 1, wherein the sampling rate of the incoming signal is less than two times the symbol rate.

3. The apparatus of claim 1, wherein the sampling rate is equal to $\alpha/T$, wherein $\alpha$ is a rational number that has a range that is greater than one and less than two, and wherein T represents the symbol interval for the incoming signal.

4. The apparatus of claim 3, wherein $\alpha$ is equal to N/M, wherein M represents the number of data streams, and wherein N represents a number of input samples received in the incoming signal that correspond to M transmitted symbols.

5. The apparatus of claim 1, wherein the taps are spaced at M/N of the symbol interval, wherein M represents the number of data streams, and wherein N represents a number of input samples received in the incoming signal that correspond to M transmitted symbols.

6. The apparatus of claim 1, wherein the instructions, when executed by the processor, causes the apparatus to output a serial stream of equalized symbols at the symbol rate.

7. The apparatus of claim 1, wherein the incoming signal comprises a plurality of input blocks, and wherein the instructions, when executed by the processor, causes the apparatus to perform a serial-to-parallel (S/P) conversion of the data streams to form data blocks that overlap with a previous input block.

8. The apparatus of claim 7, wherein each of the data blocks comprises N non-overlapping samples of the incoming signal, and wherein N represents a number of input samples received in the incoming signal that correspond to M transmitted symbols.

9. The apparatus of claim 8, wherein each of the data blocks are processed by an adaptive equalizer at a rate of 1/T, and wherein T represents the symbol interval.

10. The apparatus of claim 9, wherein the instructions, when executed by the processor, causes the apparatus to update one or more adaptive equalizer tap weights at the rate of 1/T, and wherein the adaptive equalizer tap weights are sequentially updated using an error signal.

11. The apparatus of claim 1, wherein the fractional delays are fixed fractions of the symbol interval, and wherein the fractional delays align the received signal samples with corresponding transmitted symbols prior to performing the adaptive equalization.

12. A method for implementing non-integer, sub-symbol adaptive equalization at a receiving node, the method comprising:

receiving N input samples by sampling a received input signal at a non-integer, sub-symbol sampling rate;
generating M data streams from the N input samples of the received input signal;
applying a fractional delay for each of the M streams except for one of the M streams; and
performing an adaptive equalization on one or more data blocks generated from the M streams to produce an output serial data signal,
wherein the fractional delay is decoupled from the adaptive equalization applied to the M streams,
wherein the adaptive equalization implements taps spaced at a fraction of a symbol interval for the incoming signal, and
wherein the non-integer, sub-symbol sampling rate is greater than a symbol rate associated with the input serial data signal and less than two times the symbol rate.

13. The method of claim 12, wherein M represents the number of data streams, and wherein N represents a number of input samples received in the incoming signal that correspond to M transmitted symbols, wherein the rate is set to N/M of the symbol rate, and wherein N/M is a non-integer.

14. The method of claim 12, wherein the taps are spaced at M/N of the symbol interval, and wherein the fractional delay is equal to $(\alpha-1)i$ for $i=1$ to $M-1$, and wherein $\alpha$ is equal to N/M.

15. The method of claim 12, wherein the incoming signal comprises a plurality of input blocks, and wherein the method further comprises performing a serial-to-parallel (S/P) conversion of the M streams to form data blocks that overlap with a second data block from a next time instant, wherein each of the data blocks comprise N non-overlapping samples of the input serial data signal and L-N overlapping samples of the input serial data signal, and wherein L represents a length of the adaptive equalizer.

16. The method of claim 12, further comprising adjusting a single set of adaptive equalizer tap weights is sequentially updated using an error signal.

17. An apparatus comprising:
a fractional delay filter (FDF) configured to:
receive a serial input data with a sampling rate greater than a symbol rate;
generate M streams of data from the serial input data; and
apply one or more fractional delays to the M streams of data; and
an adaptive, fractionally spaced equalizer (AFSE) coupled to the FDF, wherein the AFSE is configured to:
receive the M streams of data as a plurality of block input data; and
perform an adaptive equalization on the block input data using a non-integer, sub-symbol sampling, and
wherein the fractional delays and the adaptive equalization of the M streams of data are decoupled from each other.

18. The apparatus of claim 17, wherein the sampling rate is equal to $\alpha/T$, wherein $\alpha$ is a non-integer value that is equal to N/M, wherein N represents a number of input samples received in the incoming signal that correspond to M transmitted symbols, and wherein T represents the symbol interval for the serial input data.

19. The apparatus of claim 17, further comprising a block formation component configured to perform serial-to-parallel (S/P) conversion and produce the block input data that comprise a plurality of input samples that overlap for each of the M streams.

20. The apparatus of claim 17, wherein a total number of all AFSEs within the apparatus, including the AFSE, maps 1:1 to a total number of all analog-to-digital convertors within the apparatus, and wherein the AFSE is further configured to sequentially update a single set of adaptive equalizer tap weights from an error signal.

\* \* \* \* \*